May 13, 1930.  G. W. EMRICK  1,758,656
TAPPING ATTACHMENT
Filed July 12, 1928
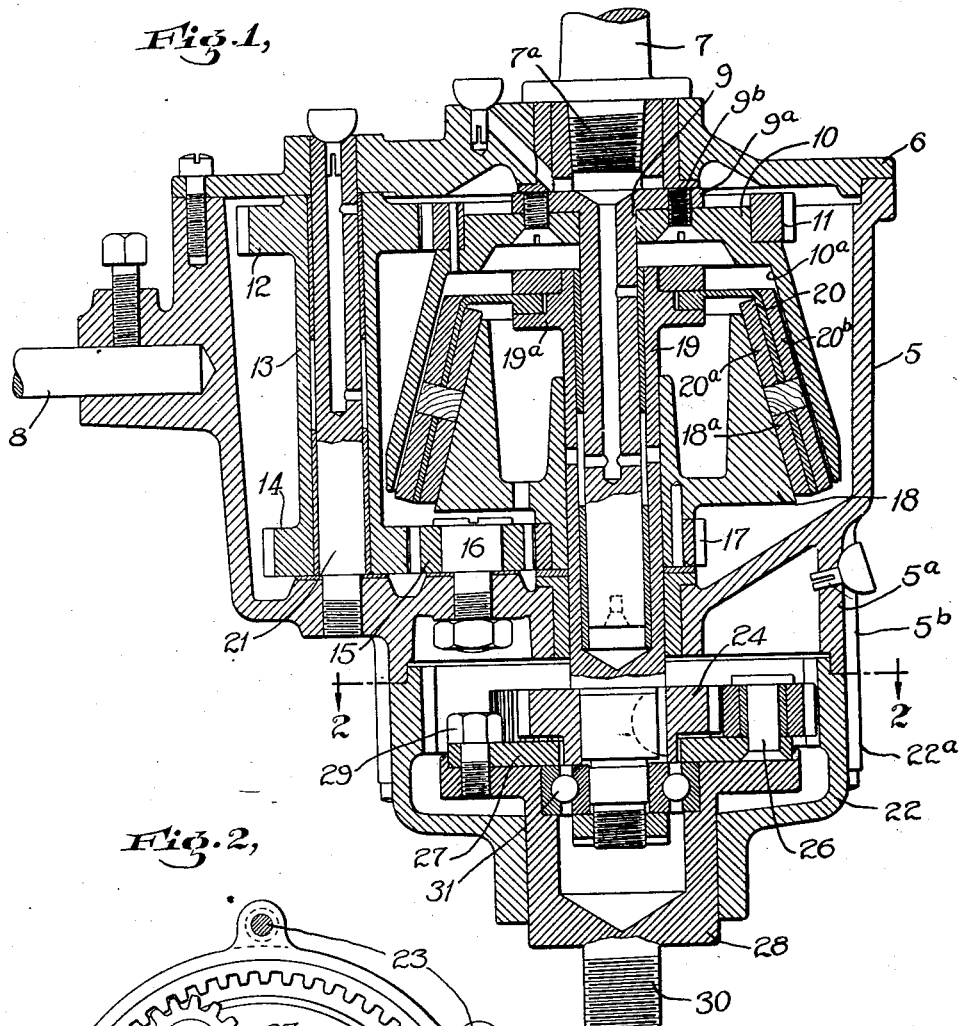
Fig. 1,
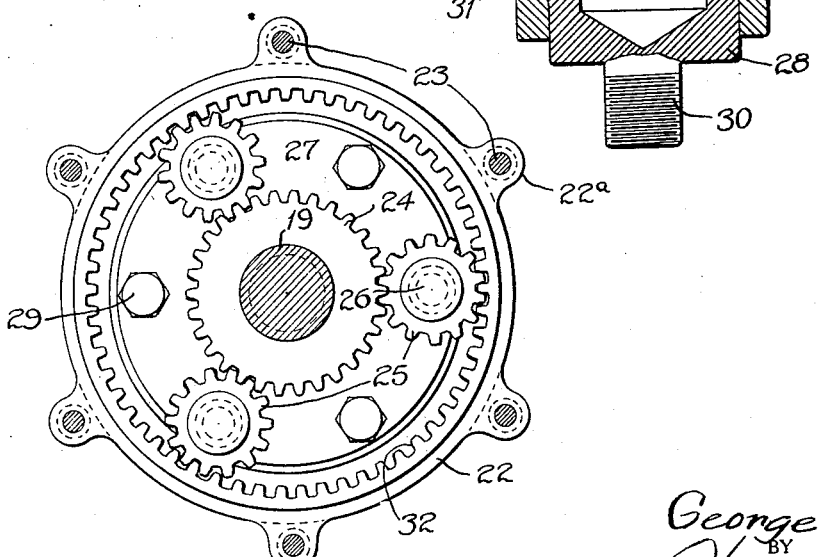
Fig. 2,
INVENTOR
George W. Emrick
BY
ATTORNEY Patented May 13, 1930

1,758,656

UNITED STATES PATENT OFFICE

GEORGE W. EMRICK, OF BROOKLYN, NEW YORK, ASSIGNOR, BY MESNE ASSIGNMENTS, TO ETTCO TOOL CO. INC., OF BROOKLYN, NEW YORK, A CORPORATION OF NEW YORK

TAPPING ATTACHMENT

Application filed July 12, 1928. Serial No. 292,242.

This invention relates to tapping attachments for use in connection with drilling, tapping or other machines; and the object of the invention is to provide an attachment of the class specified with a reduction gearing, reducing the speed of rotation of the tool coupled therewith in the operation thereof whereby a more perfect tap may be formed in a workpiece on machines of conventional form, without modifying the speed of the machine; a further object being to provide a reduction gearing of the class specified involving a fixed internal gear, a tool operating member carrying a plurality of pinions arranged to engage said internal gear and a gear driven through the tapping attachment; a further object being to provide a tapping attachment involving a dual faced friction clutch element disposed between two conical clutch members controlling the forward and reverse drive of the tool through said reduction gearing; and with these and other objects in view, the invention consists in a tapping attachment of the class and for the purpose specified which is simple in construction, efficient in use, and which is constructed as hereinafter described and claimed.

The invention described and claimed herein is an improvement on that shown and described in a prior patent of the United States, granted to me August 26, 1924, and bearing Number 1,506,367, and is fully disclosed in the following specification, of which the accompanying drawing forms a part, in which the separate parts of my improvement are designated by suitable reference characters in each of the views, and in which:—

Fig. 1 is a transverse, sectional view through the attachment; and,

Fig. 2 is a sectional, plan view on the line 2—2 of Fig. 1.

In the accompanying drawing, I have shown the structure of a tapping attachment which is substantially similar to that shown and described in my prior patent above identified. For the purpose of clearly setting forth the invention, the main operative parts of the old part of the attachment are briefly described as follows.

At 5 is represented the main casing of the attachment having a cover 6 in which is rotatably mounted the spindle 7 for securing the attachment to a suitable machine, one side of the casing 5 having a handle member 8 by means of which the attachment may be adjustably secured in position. Mounted in the casing and coupled with the screw threaded portion $7^a$ of the spindle 7 is a shaft 9 having a flange $9^a$ adjacent its upper end to which is secured a conical clutch member 10 by means of screws $9^b$, said clutch member having an internal conical clutch face $10^a$. Secured to the member 10 is a gear 11 which meshes with a gear 12 on a tubular shaft 13, the lower end of said shaft having a gear 14 which meshes with a pinion 15 rotatable on an axle 16 supported in the casing 5, the pinion 15 meshing with a gear 17 secured to another conical clutch member 18 having an external conical clutch face $18^a$. Universally supported on a supplemental shaft 19 as seen at $19^a$ and in accordance with the structure disclosed in my prior patent, is a conical clutch element 20 having inner and outer friction clutch faces $20^a$ and $20^b$ the former cooperating with the clutch face $18^a$ and the latter with the clutch face $10^a$ as will be apparent.

The supplemental shaft 19 is tubular at its upper end to receive the shaft 9 to maintain both clutch members 10 and 18 in proper alinement, the universal mounting of the clutch element permitting of the proper seating of the clutch faces $20^a$—$20^b$ on the respective clutch members. It will be noted that the shaft 13 and gears 12 and 14 are rotatably mounted on a spindle 21 arranged between the lower wall of the main casing 5 and the cover 6 thereof. It will also be apparent that suitable oil holes or passages are provided for the lubrication of the separate parts.

The foregoing description is substantially identical to the structure disclosed in my prior patent and the operation of said parts is the same as set forth therein. In carrying my present invention into effect, I provide the casing 5 with a downwardly directed extension $5^a$ having bolt bosses $5^b$ permitting of the attachment of a supplemental casing 22 having similar bosses 22ª, six of which are employed in the construction shown. Screws 23 are passed through and coupled with the bosses 5ᵇ and 22ª in securing the supplemental casing 22 to the casing 5 or the extension 5ª thereof.

The shaft 19 extends through the lower wall of the casing 5 and into the casing 22. Secured to the lower end of said shaft is a gear 24 which meshes with a plurality of pinions 25 rotatably mounted on stub shafts 26 secured to a driven member 28 by screws 29. The member 28 extends through and is rotatably mounted in the supplemental casing 22 and is provided at its lower end with a threaded stud or spindle 30 with which a chuck for supporting a tap or other tool is adapted to be coupled in the usual manner.

A ball bearing 31 is arranged in the member 28 and this bearing is mounted on the lower end of the shaft 19, the plate 27 serving to retain said bearing in position as clearly seen in the drawing. The pinions 25 which are carried by the member 28 through the plate 27 mesh with an internal gear 32 on the casing 22 so that in the rotation of the driven shaft 19 and the gear 24, the member 28 will be rotated in predetermined direction through the pinions 25, it being understood that said pinions travel circumferentially by virtue of their engagement with the fixed internal gear 32.

It will be understood that the ratio of rotation of the member 28 is reduced with respect to the rotation of the driven shaft 19 in both the forward and reverse drives of said shaft through the gearing and clutch members employed in the main casing 5 of the attachment. It will be understood that in one directional drive and with an upward thrust upon the shaft 19 through the member 28, said member 28 is driven through the clutch member 10 and the clutch element 20, whereas in the other directional drive with a downward thrust, the member 28 is driven through the clutch member 18 and clutch element 20.

It will be understood that while I have shown my improved reduction gearing as applied to a tapping attachment of specific construction, that this is merely for the purpose of illustrating one method of carrying my invention into effect, the said reduction gearing being applicable to other tapping attachments of the class under consideration.

It will also be understood that I am not necessarily limited to the specific arrangement of parts employed in the reduction gearing nor to the structure thereof, and various other changes in and modifications of the construction herein shown and described may be made within the scope of the appended claims, without departing from the spirit of my invention or sacrificing its advantages.

Having fully described my invention, what I claim as new and desire to secure by Letters Patent, is:—

1. In a tapping attachment involving a casing, a driven shaft in said casing, a supplemental shaft slidably mounted on the first named shaft and projecting through one end of the casing, means involving a gear chain within said casing for rotating said supplemental shaft in two directions and a clutch controlling the directional drive of said supplemental shaft by longitudinal movement of said supplemental shaft, a reduction gear unit comprising a supplemental casing coupled with the first named casing, a tool actuating member slidable with said supplemental shaft rotatably mounted in the supplemental casing and gears within said supplemental casing and cooperating with said member and supplemental shaft for placing them in operative engagement.

2. In a tapping attachment involving a casing, a driven shaft in said casing, a supplemental shaft slidably mounted on the first named shaft and projecting through one end of the casing, means involving a gear chain within said casing for rotating said supplemental shaft in two directions and a clutch slidable with said supplemental shaft and controlling the directional drive of said supplemental shaft, a reduction gear unit comprising a supplemental casing coupled with the first named casing, a tool actuating member rotatably mounted in the supplemental casing and gears within said supplemental casing and cooperating with said member and supplemental shaft for placing them in operative engagement, said gears comprising an internal gear on the inner wall of the supplemental casing, a gear on the projecting end of said supplemental shaft and pinions carried by said member and disposed between and meshing with the first named gears, and said last named gear, pinions and member being movable with said supplemental shaft and relatively to said internal gear.

3. In a tapping attachment involving a casing, a driven shaft in said casing, a supplemental shaft slidably mounted on the first named shaft and projecting through one end of the casing, means involving a gear chain within said casing for rotating said supplemental shaft in two directions, and a clutch slidable with said supplemental shaft and controlling the directional drive of said supplemental shaft, a reduction gear unit comprising a supplemental casing coupled with the first named casing, a tool actuating member rotatably mounted in the supplemental casing and gears within said supplemental casing and cooperating with said member and supplemental shaft for placing them in operative engagement, said gears comprising an internal gear on the inner wall of the supplemental casing, a gear on the projecting end of said supplemental shaft and pinions carried by said member and disposed between and meshing with the first named gears, and said last named gear, pinions and member being movable with said supplemental shaft and relatively to said internal gear, a bearing supporting said shaft in said member, and the lower end of said member projecting through the second named casing and having an externally threaded spindle.

In testimony that I claim the foregoing as my invention I have signed my name this 10th day of July, 1928.

GEORGE W. EMRICK.